US008433696B2

(12) United States Patent
Venkataraman et al.

(10) Patent No.: US 8,433,696 B2
(45) Date of Patent: *Apr. 30, 2013

(54) METHOD AND SYSTEM FOR PROCESSING AMBIGUOUS, MULTITERM SEARCH QUERIES

(75) Inventors: Sashikumar Venkataraman, Andover, MA (US); Rakesh Barve, Bangalore (IN); Pankaj Garg, Patiala (IN); Pranav Rajanala, Bangalore (IN); Murali Aravamudan, Windham, NH (US); Ajit Rajasekharan, West Windsor, NJ (US)

(73) Assignee: Veveo, Inc., Andover, MA (US)

( * ) Notice: Subject to any disclaimer, the term of this patent is extended or adjusted under 35 U.S.C. 154(b) by 25 days.

This patent is subject to a terminal disclaimer.

(21) Appl. No.: 12/869,991

(22) Filed: Aug. 27, 2010

(65) Prior Publication Data

US 2010/0325106 A1 Dec. 23, 2010

Related U.S. Application Data

(63) Continuation of application No. 11/235,928, filed on Sep. 27, 2005, now Pat. No. 7,788, 266.

(60) Provisional application No. 60/711,866, filed on Aug. 26, 2005, provisional application No. 60/716,101, filed on Sep. 12, 2005.

(51) Int. Cl.
*G06F 7/00* (2006.01)

(52) U.S. Cl.
USPC ............ 707/706; 707/723; 707/748; 707/752

(58) Field of Classification Search ............... 707/6, 723, 707/706, 748, 752
See application file for complete search history.

(56) References Cited

U.S. PATENT DOCUMENTS

| 1,261,167 A | 4/1918 | Russell |
| 4,045,777 A | 8/1977 | Mierzwinski et al. |

(Continued)

FOREIGN PATENT DOCUMENTS

| EP | 1050794 A2 | 11/2000 |
| EP | 1143691 A1 | 10/2001 |

(Continued)

OTHER PUBLICATIONS

Ardissono, L. et al., User Modeling and Recommendation Techniques for Personalized Electronic Program Guides, Personalized Digital Television, Editors: Ardissono, et al., Kluwer Academic Press, 2004.

(Continued)

*Primary Examiner* — Cindy Nguyen
(74) *Attorney, Agent, or Firm* — Wolf, Greenfield & Sacks, P.C.

(57) ABSTRACT

In accordance with one or more embodiments of the invention, a method and system are provided of processing a search query entered by a user of a device having a text input interface with overloaded keys. The search query is directed at identifying an item from a set of items. Each of the items has one or more associated descriptors. The system receives from the user an ambiguous search query directed at identifying a desired item. The search query is a prefix substring of each of at least two words relating to the desired item. The system dynamically identifies a group of one or more items from the set of items having one or more descriptors matching the search query as the user enters each character of the search query. The system outputs identification of the one or more items of the identified group to be displayed on the device operated by the user.

31 Claims, 9 Drawing Sheets

U.S. PATENT DOCUMENTS

| | | |
|---|---|---|
| 4,453,217 A | 6/1984 | Boivie |
| 4,760,528 A | 7/1988 | Levin |
| 4,893,238 A | 1/1990 | Venema |
| 5,224,060 A | 6/1993 | Ma et al. |
| 5,337,347 A | 8/1994 | Halstead-Nussloch et al. |
| 5,369,605 A | 11/1994 | Parks |
| 5,487,616 A | 1/1996 | Ichbiah |
| 5,532,754 A | 7/1996 | Young et al. |
| 5,623,406 A | 4/1997 | Ichbiah |
| 5,635,989 A | 6/1997 | Rothmuller |
| 5,745,889 A | 4/1998 | Burrows |
| 5,774,588 A | 6/1998 | Li |
| 5,802,361 A | 9/1998 | Wang et al. |
| 5,805,155 A | 9/1998 | Allibhoy et al. |
| 5,818,437 A | 10/1998 | Grover et al. |
| 5,828,420 A | 10/1998 | Marshall et al. |
| 5,828,991 A | 10/1998 | Skiena et al. |
| 5,835,087 A | 11/1998 | Herz et al. |
| 5,859,662 A | 1/1999 | Cragun et al. |
| 5,880,768 A | 3/1999 | Lemmons et al. |
| 5,912,664 A | 6/1999 | Eick et al. |
| 5,937,422 A | 8/1999 | Nelson et al. |
| 5,945,928 A | 8/1999 | Kushler et al. |
| 5,945,987 A | 8/1999 | Dunn |
| 5,953,541 A | 9/1999 | King et al. |
| 6,005,565 A | 12/1999 | Legall et al. |
| 6,005,597 A | 12/1999 | Barrett et al. |
| 6,006,225 A | 12/1999 | Bowman et al. |
| 6,009,459 A | 12/1999 | Belfiore et al. |
| 6,011,554 A | 1/2000 | King et al. |
| 6,041,311 A | 3/2000 | Chislenko et al. |
| 6,047,300 A | 4/2000 | Walfish et al. |
| 6,075,526 A | 6/2000 | Rothmuller |
| 6,133,909 A | 10/2000 | Schein et al. |
| 6,169,984 B1 | 1/2001 | Bogdan |
| 6,184,877 B1 | 2/2001 | Dodson et al. |
| 6,189,002 B1 | 2/2001 | Roitblat |
| 6,223,059 B1 | 4/2001 | Haestrup |
| 6,260,050 B1 | 7/2001 | Yost et al. |
| 6,266,048 B1 | 7/2001 | Carau, Sr. |
| 6,266,814 B1 | 7/2001 | Lemmons et al. |
| 6,269,361 B1 | 7/2001 | Davis et al. |
| 6,286,064 B1 | 9/2001 | King et al. |
| 6,292,804 B1 | 9/2001 | Ardoin et al. |
| 6,307,548 B1 | 10/2001 | Flinchem et al. |
| 6,307,549 B1 | 10/2001 | King et al. |
| 6,377,945 B1 | 4/2002 | Risvik |
| 6,438,579 B1 | 8/2002 | Hosken et al. |
| 6,438,751 B1 | 8/2002 | Voyticky et al. |
| 6,466,933 B1 | 10/2002 | Huang et al. |
| 6,529,903 B2 | 3/2003 | Smith |
| 6,564,213 B1 * | 5/2003 | Ortega et al. ........................ 1/1 |
| 6,564,313 B1 | 5/2003 | Kashyap |
| 6,594,657 B1 | 7/2003 | Livowsky et al. |
| 6,600,496 B1 | 7/2003 | Wagner et al. |
| 6,614,455 B1 | 9/2003 | Cuijpers et al. |
| 6,615,248 B1 | 9/2003 | Smith |
| 6,631,496 B1 | 10/2003 | Li et al. |
| 6,721,954 B1 | 4/2004 | Nickum |
| 6,732,369 B1 | 5/2004 | Schein et al. |
| 6,757,906 B1 | 6/2004 | Look et al. |
| 6,766,526 B1 | 7/2004 | Ellis |
| 6,772,147 B2 | 8/2004 | Wang |
| 6,785,671 B1 | 8/2004 | Bailey et al. |
| 6,801,909 B2 | 10/2004 | Delgado et al. |
| 6,839,702 B1 | 1/2005 | Patel et al. |
| 6,839,705 B1 | 1/2005 | Grooters |
| 6,850,693 B2 | 2/2005 | Young et al. |
| 6,865,575 B1 | 3/2005 | Smith et al. |
| 6,865,746 B1 | 3/2005 | Herrington et al. |
| 6,907,273 B1 | 6/2005 | Smethers |
| 6,965,374 B2 | 11/2005 | Villet et al. |
| 7,013,304 B1 | 3/2006 | Schuetze et al. |
| 7,117,207 B1 | 10/2006 | Kerschberg et al. |
| 7,130,866 B2 | 10/2006 | Schaffer |
| 7,136,854 B2 | 11/2006 | Smith |
| 7,146,627 B1 | 12/2006 | Ismail et al. |
| 7,149,983 B1 | 12/2006 | Robertson et al. |
| 7,213,256 B1 | 5/2007 | Kikinis |
| 7,225,180 B2 | 5/2007 | Donaldson et al. |
| 7,225,184 B2 | 5/2007 | Carrasco et al. |
| 7,225,455 B2 | 5/2007 | Bennington et al. |
| 7,269,548 B2 | 9/2007 | Fux et al. |
| 7,293,231 B1 | 11/2007 | Gunn et al. |
| 7,487,151 B2 | 2/2009 | Yamamoto et al. |
| 7,536,384 B2 | 5/2009 | Venkataraman et al. |
| 7,594,244 B2 | 9/2009 | Scholl et al. |
| 2002/0002550 A1 | 1/2002 | Berman |
| 2002/0042791 A1 | 4/2002 | Smith et al. |
| 2002/0052873 A1 | 5/2002 | Delgado et al. |
| 2002/0059621 A1 | 5/2002 | Thomas et al. |
| 2002/0083448 A1 | 6/2002 | Johnson |
| 2002/0133481 A1 | 9/2002 | Smith et al. |
| 2002/0144267 A1 | 10/2002 | Gutta et al. |
| 2002/0152190 A1 | 10/2002 | Biebesheimer et al. |
| 2002/0184373 A1 | 12/2002 | Maes |
| 2002/0188488 A1 | 12/2002 | Hinkle |
| 2002/0199194 A1 | 12/2002 | Ali |
| 2003/0005452 A1 | 1/2003 | Rodriguez |
| 2003/0005462 A1 | 1/2003 | Broadus et al. |
| 2003/0011573 A1 | 1/2003 | Villet et al. |
| 2003/0014753 A1 | 1/2003 | Beach et al. |
| 2003/0023976 A1 | 1/2003 | Kamen et al. |
| 2003/0037043 A1 | 2/2003 | Chang et al. |
| 2003/0037333 A1 | 2/2003 | Ghashghai et al. |
| 2003/0046698 A1 | 3/2003 | Kamen et al. |
| 2003/0051240 A1 | 3/2003 | Schaffer et al. |
| 2003/0066068 A1 | 4/2003 | Gutta et al. |
| 2003/0066079 A1 | 4/2003 | Suga |
| 2003/0084270 A1 | 5/2003 | Coon et al. |
| 2003/0103088 A1 | 6/2003 | Dresti et al. |
| 2003/0217121 A1 | 11/2003 | Willis |
| 2003/0226146 A1 | 12/2003 | Thurston et al. |
| 2003/0229900 A1 | 12/2003 | Reisman |
| 2003/0237096 A1 | 12/2003 | Barrett et al. |
| 2004/0013909 A1 | 1/2004 | Shimizu et al. |
| 2004/0021691 A1 | 2/2004 | Dostie et al. |
| 2004/0024777 A1 | 2/2004 | Schaffer |
| 2004/0046744 A1 | 3/2004 | Rafii et al. |
| 2004/0049783 A1 | 3/2004 | Lemmons et al. |
| 2004/0054520 A1 | 3/2004 | Dehlinger et al. |
| 2004/0073926 A1 | 4/2004 | Nakamura et al. |
| 2004/0078815 A1 | 4/2004 | Lemmons et al. |
| 2004/0078816 A1 | 4/2004 | Johnson |
| 2004/0078820 A1 | 4/2004 | Nickum |
| 2004/0083198 A1 | 4/2004 | Bradford et al. |
| 2004/0093616 A1 | 5/2004 | Johnson |
| 2004/0111745 A1 | 6/2004 | Schein et al. |
| 2004/0128686 A1 | 7/2004 | Boyer et al. |
| 2004/0139091 A1 | 7/2004 | Shin |
| 2004/0143569 A1 | 7/2004 | Gross et al. |
| 2004/0163032 A1 | 8/2004 | Guo et al. |
| 2004/0194141 A1 | 9/2004 | Sanders |
| 2004/0216160 A1 | 10/2004 | Lemmons et al. |
| 2004/0220926 A1 | 11/2004 | Lamkin et al. |
| 2004/0221308 A1 | 11/2004 | Cuttner et al. |
| 2004/0261021 A1 | 12/2004 | Mittal et al. |
| 2005/0015366 A1 | 1/2005 | Carrasco et al. |
| 2005/0071874 A1 | 3/2005 | Elcock et al. |
| 2005/0086234 A1 | 4/2005 | Tosey |
| 2005/0086691 A1 | 4/2005 | Dudkiewicz et al. |
| 2005/0086692 A1 | 4/2005 | Dudkiewicz et al. |
| 2005/0174333 A1 | 8/2005 | Robinson et al. |
| 2005/0192944 A1 | 9/2005 | Flinchem |
| 2005/0210020 A1 | 9/2005 | Gunn et al. |
| 2005/0210383 A1 | 9/2005 | Cucerzan et al. |
| 2005/0210402 A1 | 9/2005 | Gunn et al. |
| 2005/0223308 A1 | 10/2005 | Gunn et al. |
| 2005/0240580 A1 | 10/2005 | Zamir et al. |
| 2005/0246311 A1 | 11/2005 | Whelan et al. |
| 2005/0267994 A1 | 12/2005 | Wong et al. |
| 2005/0278175 A1 | 12/2005 | Hyvonen |
| 2005/0283468 A1 | 12/2005 | Kamvar et al. |
| 2006/0010477 A1 | 1/2006 | Yu |
| 2006/0013487 A1 | 1/2006 | Longe et al. |
| 2006/0036640 A1 | 2/2006 | Tateno et al. |
| 2006/0059044 A1 | 3/2006 | Chan et al. |

| | | | |
|---|---|---|---|
| 2006/0075429 A1 | 4/2006 | Istvan et al. | |
| 2006/0090182 A1 | 4/2006 | Horowitz et al. | |
| 2006/0090185 A1 | 4/2006 | Zito et al. | |
| 2006/0101499 A1 | 5/2006 | Aravamudan et al. | |
| 2006/0101503 A1 | 5/2006 | Venkataraman | |
| 2006/0101504 A1 | 5/2006 | Aravamudan et al. | |
| 2006/0112162 A1 | 5/2006 | Marot et al. | |
| 2006/0117019 A1 | 6/2006 | Sylthe et al. | |
| 2006/0163337 A1 | 7/2006 | Unruh | |
| 2006/0167676 A1 | 7/2006 | Plumb | |
| 2006/0167859 A1* | 7/2006 | Verbeck Sibley et al. | 707/3 |
| 2006/0173818 A1 | 8/2006 | Berstis et al. | |
| 2006/0190308 A1 | 8/2006 | Janssens et al. | |
| 2006/0195435 A1 | 8/2006 | Laird-McConnell et al. | |
| 2006/0206454 A1 | 9/2006 | Forstall et al. | |
| 2006/0242178 A1 | 10/2006 | Butterfield et al. | |
| 2006/0256078 A1 | 11/2006 | Flinchem et al. | |
| 2006/0259344 A1 | 11/2006 | Patel et al. | |
| 2006/0274051 A1 | 12/2006 | Longe et al. | |
| 2006/0282856 A1 | 12/2006 | Errico et al. | |
| 2007/0005526 A1 | 1/2007 | Whitney et al. | |
| 2007/0005563 A1 | 1/2007 | Aravamudan | |
| 2007/0016476 A1 | 1/2007 | Hoffberg et al. | |
| 2007/0027852 A1 | 2/2007 | Howard et al. | |
| 2007/0027861 A1 | 2/2007 | Huentelman et al. | |
| 2007/0044122 A1 | 2/2007 | Scholl et al. | |
| 2007/0050337 A1 | 3/2007 | Venkataraman et al. | |
| 2007/0050348 A1 | 3/2007 | Aharoni et al. | |
| 2007/0061244 A1 | 3/2007 | Ramer et al. | |
| 2007/0061317 A1 | 3/2007 | Ramer et al. | |
| 2007/0061321 A1 | 3/2007 | Venkataraman | |
| 2007/0061754 A1 | 3/2007 | Ardhanari et al. | |
| 2007/0067272 A1 | 3/2007 | Flynt et al. | |
| 2007/0088681 A1 | 4/2007 | Aravamudan et al. | |
| 2007/0100650 A1 | 5/2007 | Ramer et al. | |
| 2007/0130128 A1 | 6/2007 | Garg et al. | |
| 2007/0143567 A1 | 6/2007 | Gorobets | |
| 2007/0150606 A1 | 6/2007 | Flinchem et al. | |
| 2007/0208718 A1 | 9/2007 | Javid et al. | |
| 2007/0219984 A1 | 9/2007 | Aravamudan et al. | |
| 2007/0219985 A1 | 9/2007 | Aravamudan et al. | |
| 2007/0255693 A1 | 11/2007 | Ramaswamy et al. | |
| 2007/0256070 A1 | 11/2007 | Bykov et al. | |
| 2007/0260703 A1 | 11/2007 | Ardhanari et al. | |
| 2007/0266021 A1 | 11/2007 | Aravamudan et al. | |
| 2007/0266026 A1 | 11/2007 | Aravamudan et al. | |
| 2007/0266406 A1 | 11/2007 | Aravamudan et al. | |
| 2007/0271205 A1 | 11/2007 | Aravamudan et al. | |
| 2007/0276773 A1 | 11/2007 | Aravamudan et al. | |
| 2007/0276821 A1 | 11/2007 | Aravamudan et al. | |
| 2007/0276859 A1 | 11/2007 | Aravamudan et al. | |
| 2007/0288456 A1 | 12/2007 | Aravamudan et al. | |
| 2007/0288457 A1 | 12/2007 | Aravamudan et al. | |
| 2008/0086704 A1 | 4/2008 | Aravamudan | |
| 2008/0114743 A1 | 5/2008 | Venkataraman et al. | |
| 2008/0209229 A1 | 8/2008 | Ramakrishnan et al. | |

FOREIGN PATENT DOCUMENTS

| | | |
|---|---|---|
| EP | 1338967 A2 | 8/2003 |
| EP | 1463307 A2 | 9/2004 |
| WO | WO 00/70505 A1 | 11/2000 |
| WO | WO 2004/010326 A1 | 1/2004 |
| WO | WO 2004/031931 A1 | 4/2004 |
| WO | WO 2005/033967 A2 | 4/2005 |
| WO | WO 2005/084235 A2 | 9/2005 |

OTHER PUBLICATIONS

Dalianis, Improving Search Engine Retrieval Using a Compound Splitter for Swedish, Abstract of Presentation at NODALIDA 2005—15th Nordic Conference on Computational Linguistics, Joensuu Finland, May 21-22, 2005. Retrieved Jan. 5, 2006 from http://phon.joensuu.fi/nodalida/abstract/03.shtml.

Digital Video Broadcasting, http://www.dvb.org (Oct. 12, 2007).

Flinchem, E., U.S. Appl. No. 60/548,589, filed Sep. 1, 2005.

Gadd, T.N., Phonix: The Algorithm, Program 24(4), Oct. 1990, pp. 363-369.

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report, International Application No. PCT/US06/25249, mailed Jan. 29, 2008 (2 pages).

International Search Report, International Application No. PCT/US06/33204, mailed Sep. 21, 2007 (2 pages).

International Search Report, International Application No. PCT/US06/33257, mailed Mar. 26, 2008 (2 pages).

International Search Report, International Application No. PCT/US06/33258, mailed Mar. 26, 2008 (2 pages).

International Search Report, International Application No. PCT/US06/40005, mailed Jul. 3, 2007 (4 pages).

International Search Report, International Application No. PCT/US07/65703, mailed Jan. 25, 2008 (2 pages).

International Search Report, International Application No. PCT/US07/67100, mailed Mar. 7, 2008 (2 pages).

Kurapati, et al., "A Multi-Agent TV Recommender," In Proceedings of the UM 2001 Workshop "Personalization in Future TV," 2001, 8 pages.

Mackenzie et al., Letterwise: Prefix-Based Disambiguation for Mobile Text Input, Proceedings of the ACM Symposium on User Interface Software and Technology—UIST 2001, pp. 111-120.

Matthom, "Text Highlighting in Search Results", Jul. 22, 2005. Available at www.matthom.com/archive/2005/07/22/text-highlighting-in-search-results- ; retrieved Jun. 23, 2006. (4 pages).

Mokotoff, Soundexing and Geneaology, Available at http://www.avotaynu.com/soundex.html, retrieved Mar. 19, 2008, last updated Sep. 8, 2007 (6 pages).

Nardi, et al., "Integrating Communications and Information Through Contact Map," Communications of the ACM, vol. 45, No. 4, Apr. 2002, 7 pages, retrieved from URL:http://portal.acm.org/citation.cfm?id+505251>.

Press Release From TEGIC Communications, TEGIC Communications is Awarded Patent for Japanese T9(R) Text Input Software From the Japan Patent Office, Oct. 12, 2004. Retrieved Nov. 18, 2005 From http://www.tegic.com/press.sub.--view.html?release.sub.--num=55254242.

Review of Personalization Technologies: Collaborative Filtering vs. ChoiceStream's Attributized Bayesian Choice Modeling, Technology Brief, ChoiceStream Technologies, Cambridge, MA.

Roe, David et al., "Mapping UML Models Incorporating OCL Constraints into Object-Z", Technical Report, Sep. 2003, Department of Computing Imperial College London (17 pages).

Silfverberg et al., Predicting Text Entry Speed on Mobile Phones, Proceedings of the ACM Conference on Human Factors in Computing Systems—CHI 2000. pp. 9-16.

Supplemental European Search Report for 05826114.0 dated Aug. 20, 2009, 13 pages.

Supplemental European Search Report for 05826129.8 dated Aug. 11, 2009, 15 pages.

Supplemental European Search Report for 068381797.7 dated Dec. 9, 2009, 7 pages.

Supplemental European Search Report for 07761026.9 dated Jan. 28, 2010, 8 pages.

Supplemental European Search Report for PCT/US2005/040415 dated Aug. 11, 2009, 15 pages.

Supplemental European Search Report for PCT/US2005/040424 dated Aug. 20, 2009, 13 pages.

Talbot, David. "Soul of a New Mobile Machine." Technology Review: The Design Issue May/Jun. 2007. (pp. 46-53).

Turski, et al., "Inner Circl—People Centered Email Client," CHI 2005 Conference on Human Factors in Computing Systems, Apr. 2005, pp. 1845-1848, 4 pages, retrieved from URL:http://portal.acm.org/citation.cfm?id+1056808.1057037.

Wikipedia's entry for Levenshtein distance (n.d.). Retrieved Nov. 15, 2006 from http://en.wikipedia.org/wiki/Levenshtein.sub.--distance.

Written Opinion of the International Searching Authority, International Application No. PCT/US06/25249, mailed Jan. 29, 2008.

Written Opinion of the International Searching Authority, International Application No. PCT/US06/33204, mailed Sep. 21, 2007 (3 pages).

Written Opinion of the International Searching Authority, International Application No. PCT/US06/33257, mailed Mar. 26, 2008 (4 pages).

Written Opinion of the International Searching Authority, International Application No. PCT/US06/33258, mailed Mar. 26, 2008 (4 pages).

Written Opinion of the International Searching Authority, International Application No. PCT/US06/40005, mailed Jul. 3, 2007 (4 pages).

Written Opinion of the International Searching Authority, International Application No. PCT/US07/65703, mailed Jan. 25, 2008 (4 pages).

Written Opinion of the International Searching Authority, International Application No. PCT/US07/67100, mailed Mar. 7, 2008 (3 pages).

Complaint in *Veveo, Inc. v. Verizon Services Corp., Verizon Communications Inc., and Verizon Data Services India Pvt. Ltd.*, U.S. District Court Southern District of New York, Civil Action No. 10-CIV-6709 (JFK), filed Sep. 9, 2010, pp. 1-14.

First Amended Complain in *Veveo, Inc. v. Verizon Services Corp., Verizon Communications Inc., and Verizon Data Services LLC*, U.S. District Court Southern District of New York, Civil Action No. 10-CIV-6709 (JFK), filed Nov. 16, 2010, 16 pages.

Verizon's Answer to First Amended Complain and Counterclaims in *Veveo, Inc. v. Verizon Services Corp., Verizon Communications Inc., and Verizon Data Services LLC*, U.S. District Court Southern District of New York, Civil Action No. 10-CIV-6709 (JFK), filed Dec. 9, 2010, pp. 1-17.

\* cited by examiner

802

| |
|---|
| The Koala Brothers: Archie's Loose Tooth; Pe |
| The Koala Brothers: George's Day Off; Archie |
| The Koala Brothers: Alice Rides Again; Ned |
| Charlie and Lola: I'm Not Feeling Well |
| Rockos Modern Life: Junk Junkies; Day of the |
| Rockos Modern Life: Born to Spawn; Uniform |
| Charlie and Lola: It's My Book |

INPUT TERM: 5 (J)

| |
|---|
| The Koala Brothers: Archie's Loose Tooth; Pe |
| The Koala Brothers: George's Day Off; Archie |
| Rockos Modern Life: Born to Spawn; Uniform |
| The New Adventures of Winnie the Pooh; Ee |
| Charlie and Lola: My Wobbly Tooth |
| Charlie and Lola: The Most Wonderfullest Pic |
| Lizzie McGuire: Educating Ethan |

INPUT TERM: 5 86 (J TO)

| Tom and Jerry Kids: Circus Antics; Tres Sheil |
| Tom and Jerry Kids: No Biz LikeSnow Biz; Ma |
| Tom and Jerry Kids: Cleocatra; Me Wolfenste |
| Tom and Jerry Kids: Zorrito; Deep Sleep Droo |
| Tom and Jerry Kids: Who Are You Kitten?; B |
| Tom and Jerry Kids: Catch That Mouse; Good |
| Tom and Jerry Kids: Father's Day; Scourge of |

INPUT TERM: 5 866 (J TOM)

FIG. 8C

METHOD AND SYSTEM FOR PROCESSING AMBIGUOUS, MULTITERM SEARCH QUERIES

RELATED APPLICATIONS

This application is a continuation of U.S. patent application Ser. No. 11/235,928, entitled Method And System For Processing Ambiguous, Multi-Term Search Queries, filed Sep. 27, 2005, now U.S. Pat. No. 7,788,266, which claims the benefit under 35 U.S.C. §119(e) of U.S. Provisional Patent Application Ser. No. 60/716,101, filed Sep. 12, 2005, and entitled Method And System For Incremental Search With Reduced Text Entry Using A Reduced Keypad With Overloaded Keys, and U.S. patent application No. 60/711,866, filed Aug. 26, 2005, and entitled A Dynamic Highlighting Interface of Multi Word Prefixes of Results Obtained by Incremental Search with Reduced Text Entry on Television and Mobile Devices Using a Keypad with Overloaded Keys; U.S. Pat. No. 7,788,266 and U.S. Provisional Patent Application Ser. No. 60/716,101 are incorporated by reference herein in their entirety.

BACKGROUND OF THE INVENTION

1. Field of Invention

The present invention generally relates to processing search queries and, more particularly, to methods and systems for processing ambiguous, reduced text, multi-term search queries.

2. Description of Related Art

There are many user-operated devices such as mobile phones, PDAs (personal digital assistants), and television remote control devices that have small keypads, which a user can use for text entry. In many of these devices, largely because of device size restrictions, the keypad is small and has only a small number of keys, which are overloaded with alpha-numeric characters. Text input using these keypads is cumbersome.

FIG. 1 illustrates a common twelve-key keypad interface found in many cell phones and other mobile devices, and also increasingly in television remote control devices. The keypad 10 includes twelve keys 12, most of which are overloaded with multiple alpha-numeric characters or functions. The same key can be used to enter different characters. For instance, the "2" key can be used to enter the number "2" and the letters "A", "B" and "C". Text entry using such a keypad with overloaded keys can result in an ambiguous text entry, which requires some type of a disambiguation action. For instance, with a multi-press interface, a user can press a particular key multiple times in quick succession to select a desired character (e.g., to choose "B", the user would press the "2" key twice quickly, and to choose "C", the user would press the key three times). Alternatively, text entry can be performed using T9 and other text input mechanisms that provide vocabulary based completion choices for each word entered. Neither of these methods is however particularly useful for performing searches because of the number of steps needed to get to the result. One deficiency of the multi-press interface is that too many key strokes are needed. A drawback of applying a vocabulary based word completion interface is the need for the additional step of making a choice from a list of all possible word matches generated by the ambiguous text input. Furthermore vocabulary based word disambiguation systems are designed typically for composition applications (as opposed to search applications) where user explicitly disambiguates each word by performing a word completion action to resolve that word before proceeding to the next word in the composition.

BRIEF SUMMARY OF EMBODIMENTS OF THE INVENTION

In accordance with one or more embodiments of the invention, a method and system are provided of processing a search query entered by a user of a device having a text input interface with overloaded keys. The search query is directed at identifying an item from a set of items. Each of the items has one or more associated descriptors. The system receives from the user an ambiguous search query directed at identifying a desired item. The search query comprises a prefix substring of each of at least two words relating to the desired item. The system dynamically identifies a group of one or more items from the set of items having one or more descriptors matching the search query as the user enters each character of the search query. The system outputs identification of the one or more items of the identified group to be displayed on the device operated by the user.

These and other features will become readily apparent from the following detailed description wherein embodiments of the invention are shown and described by way of illustration. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a more complete understanding of various embodiments of the present invention, reference is now made to the following descriptions taken in connection with the accompanying drawings in which:

FIGS. 8A to 8C illustrate the incremental results retrieved when a user enters characters in a search query in accordance with one or more embodiments of the invention.

Like reference numerals generally refer to like elements in the drawings.

DETAILED DESCRIPTION OF EMBODIMENTS OF THE INVENTION

Briefly, methods and systems are provided in accordance with various embodiments of the invention for performing searches using ambiguous text input from devices having limited text input interfaces.

As described in further detail below, in accordance with various embodiments of the invention, methods and systems are provided for processing a search query entered by a user of a device having a text input interface with overloaded keys. The search query is directed at identifying an item from a set of items. Each of the items has one or more associated descriptors. The descriptors can include words in the name of the item or other information relating to the item. For example, in a television application, the item can be a television content item such as a movie, and the descriptors can be information on the title of the movie, the cast, directors, and other keywords and descriptions of the movie.

Using the text input interface, the user can enter an ambiguous search query directed at identifying a desired item. The search query comprises a prefix substring of each of at least two words relating to the desired item. A prefix substring of a word is a variable length string of characters that contains fewer than all the characters making up the word.

The system dynamically identifies a group of one or more items from the set of items having one or more descriptors matching the search query as the user enters each character of the search query. The group of the one or more items is displayed on the device operated by the user. The items are preferably displayed in an order of expected interest to the user.

Figure 1:
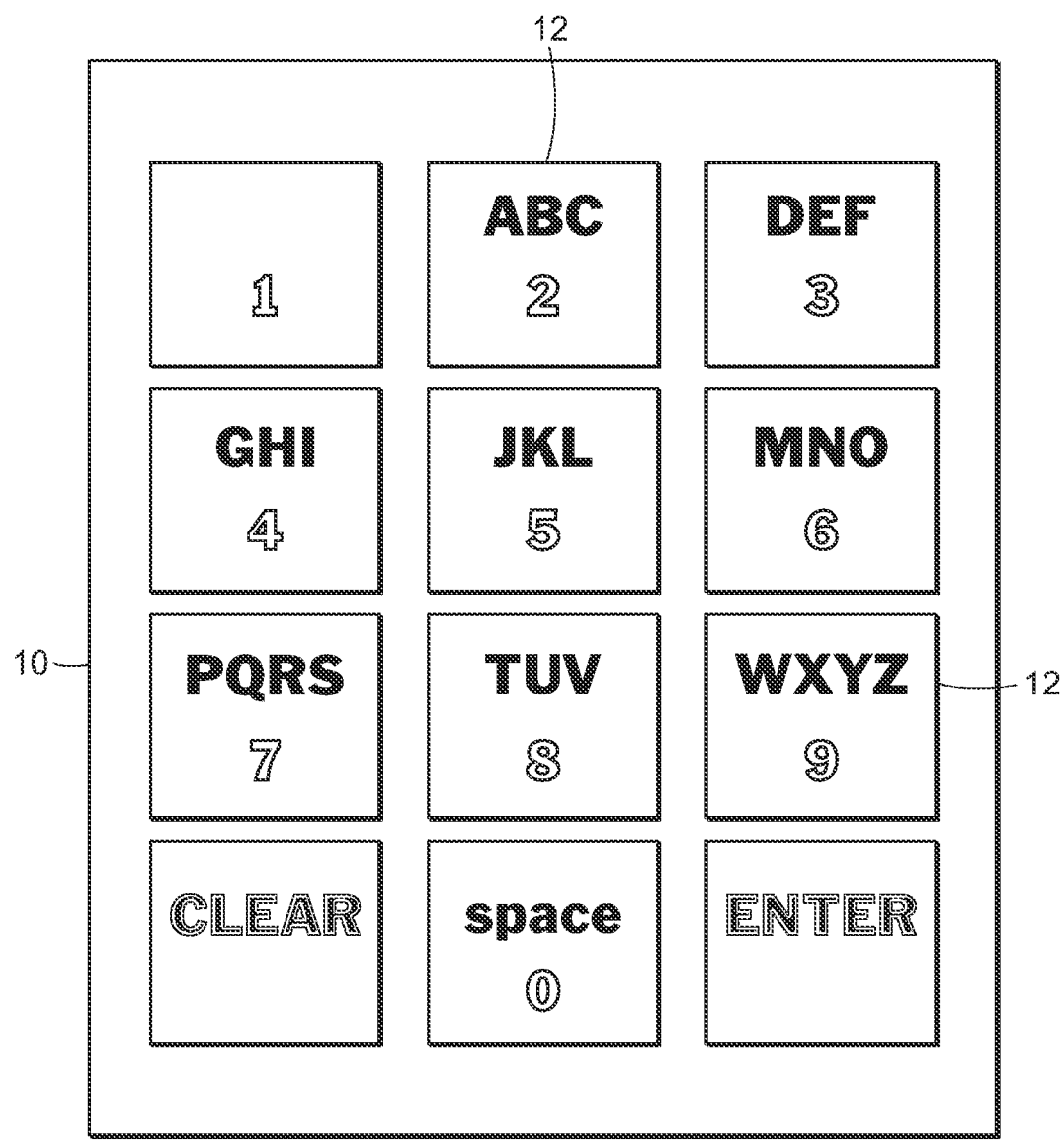
FIG. 1 illustrates a keypad with overloaded keys in accordance with the prior art.

The user types in the multiple term prefix input query by pressing overloaded keys of the text input interface once to form an ambiguous query string. In accordance with one or more embodiments of the invention, the search space is initially indexed by performing a many-to-many mapping from the alphanumeric space of terms to numeric strings corresponding to the various prefixes of each alphanumeric term constituting the query string. In a numeric string, each alphanumeric character in the string is replaced by its corresponding numeric equivalent based on, e.g., the arrangement of characters on the commonly used twelve-key reduced keypad shown in FIG. 1. This mapping scheme enables the system in accordance with one or more embodiments to incrementally retrieve results matching the ambiguous alphanumeric input query, as the user types in each character of the query. The user does not have to explicitly specify the termination of each term to assist the system in disambiguating the input query; instead, the user only enters an input query that includes prefix substrings from multiple terms. The system can leverage off the multiple term prefixes to disambiguate it. The multiple term prefix based disambiguation method in accordance with one or more embodiments of the invention reduces the amount of text and steps needed to enter a multiple term input query and retrieve results.

There are various possible applications for the search techniques described herein including, e.g., assisting television viewers in identifying desired television content items and channels, and assisting users of mobile devices such as cell phones and PDAs in performing searches for items in various databases (e.g., performing searches in directories of people or businesses, and searching for and purchasing products/services like airline tickets).

In the context of television systems, the term "television content items" can include a wide variety of video/audio content including, but not limited to, television shows, movies, music videos, or any other identifiable content that can be selected by a television viewer. Searching for television content items can be performed across disparate content sources including, but not limited to, broadcast television, VOD, IPTV, and PVR (local and network).

Figure 2:
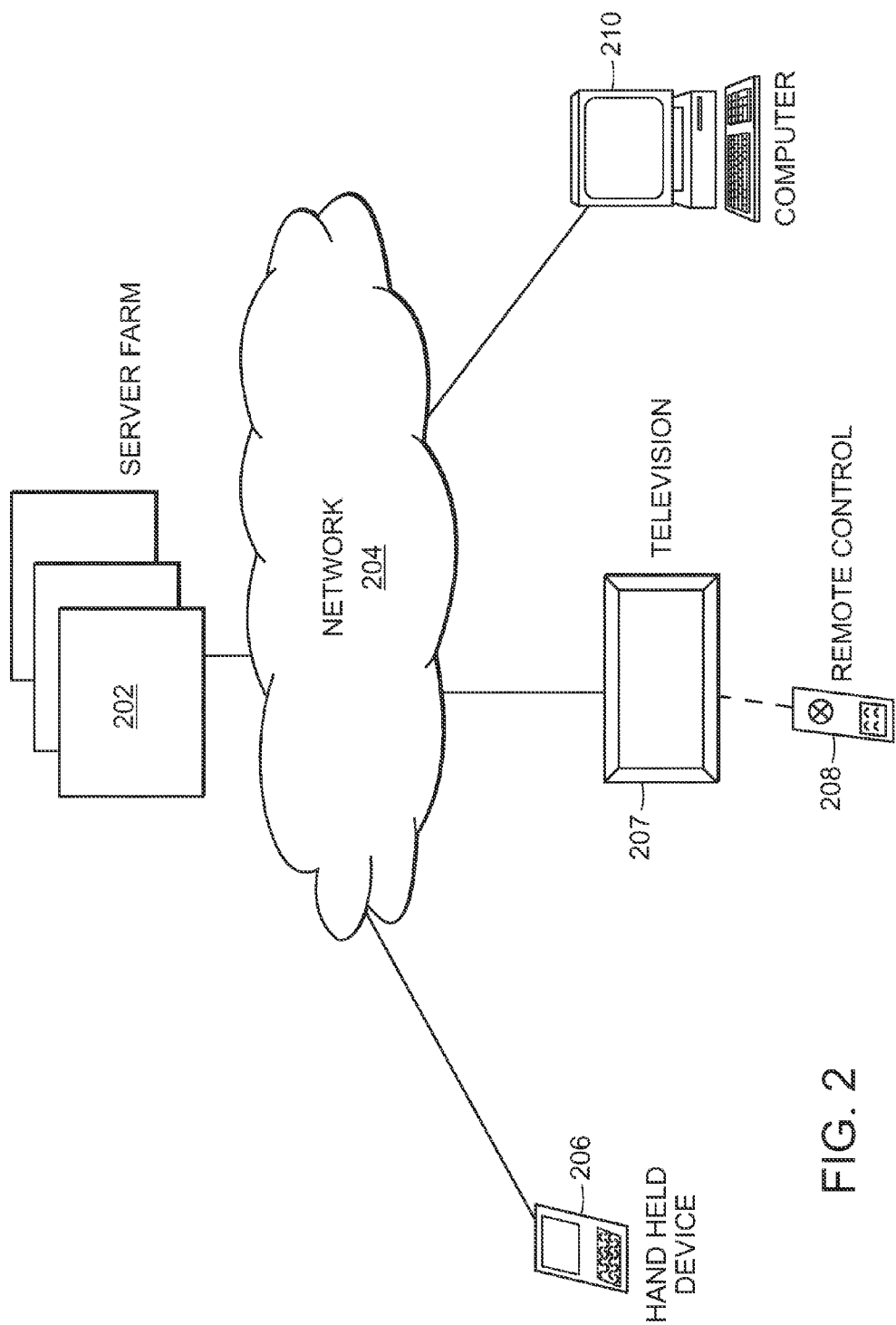
FIG. 2 illustrates a search system in accordance with one or more embodiments of the invention.

FIG. 2 schematically illustrates an overall system for performing searches with reduced text entry using various devices in accordance with one or more embodiments of the invention. The system includes a server farm or system 202, a network 204, and a variety of devices 206, 208, 210 operated by users with text input interfaces. In accordance with one or more embodiments of the invention, the server 202 processes search queries received from the user devices 206, 208, 210. In other embodiments, the search queries are processed on the devices themselves. As discussed below, the server 202 can be the source of search data and relevance updates. If part of a television system, the server 202 can also be the source of or be linked to a source of at least some of the available television content (e.g., a cable or satellite television operator).

The network 204 functions as the distribution framework for transmitting data from the server 202 to the devices operated by the users. The distribution network 204 could be wired or wireless connections or some combination thereof. Examples of possible networks include computer networks, cable television networks, satellite television networks, IP-based television networks, and mobile communications networks (such as, e.g., wireless CDMA and GSM networks).

The search devices could have a wide range of interface capabilities. A device, e.g., could be a hand-held mobile communications device 206 such as a phone or PDA having a limited display size and a reduced keypad with overloaded keys. Another type of search device is a television system 207 with a remote control device 208 having an overloaded keypad. Another possible search device is a Personal Computer (PC) 210 with a full or reduced keyboard and a computer display.

Figure 3:
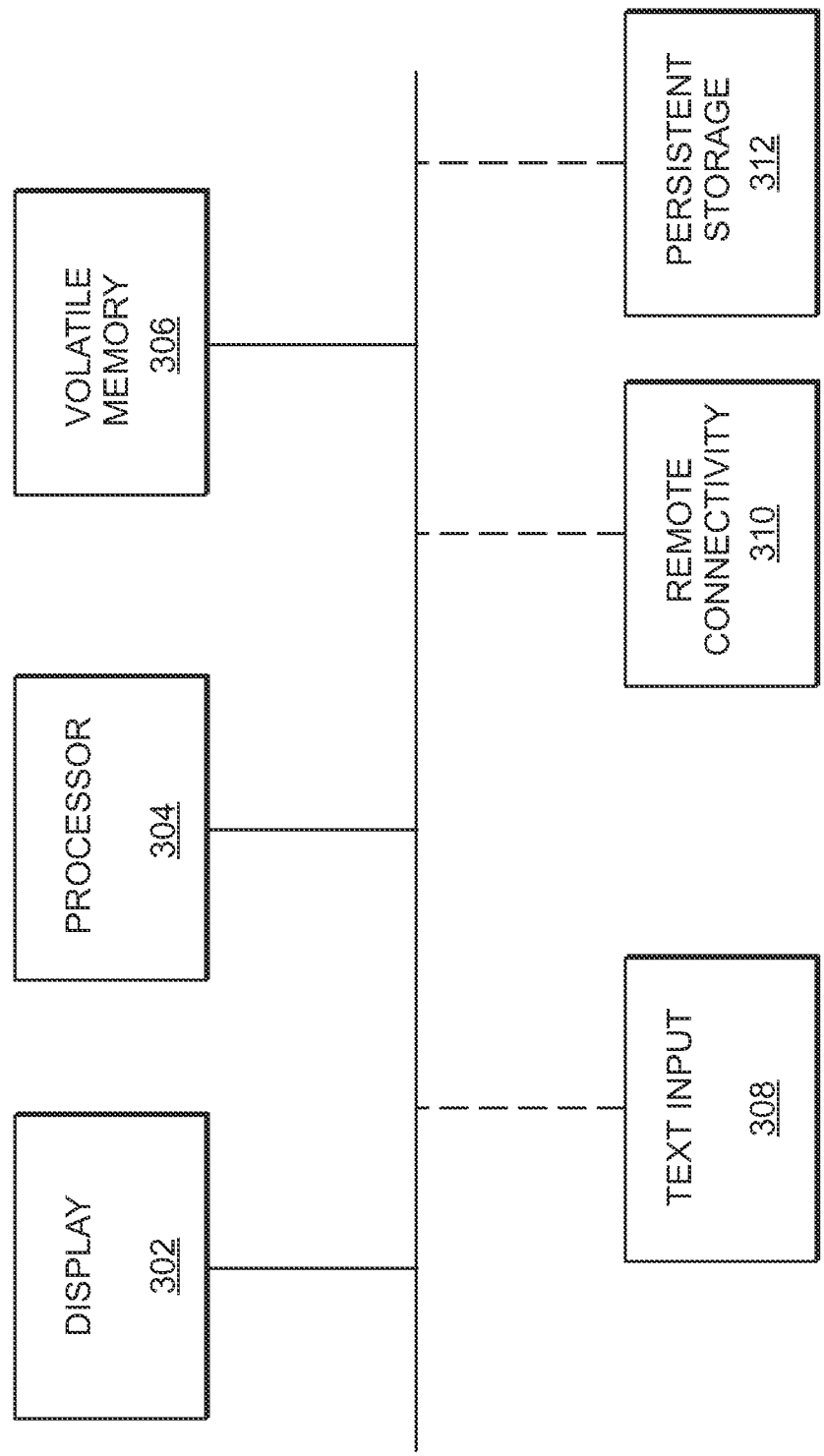
FIG. 3 illustrates various device configuration options for a device for performing searches in accordance with one or more embodiments of the invention.

FIG. 3 illustrates multiple exemplary configurations for search devices in accordance with various embodiments of the invention. In one configuration, a search device (e.g., PC 210) can have a display 302, a processor 304, volatile memory 306, text input interface 308, remote connectivity 310 to the server 202 through the network 204, and a persistent storage 312. A device configuration for a device such as the hand-held device 206 might not include local persistent storage 312. In this case, the device 206 could have remote connectivity 310 to submit the query to the server 202 and retrieve results from it. Another configuration of the devices 206, 208, 210 may not have remote connectivity 310. In this case, the search database may be locally resident on a local persistent storage 312. The persistent storage 312 may be, e.g., a removable storage element such as SD, SmartMedia, CompactFlash card etc. In a configuration of the device with remote connectivity 310 and persistent storage 312 for performing searches (e.g., a television system 207), the device may use the remote connectivity for search relevance data update or for the case where the search database is distributed on the local storage 312 and on the server 202. A preferred configuration in a memory constrained device is the search data residing remotely on a server. Unlike composition applications where the "most frequently used or popular terms space" are small in size and can be maintained in a local vocabulary, search spaces are typically larger inherently because people instinctively use "unique word signatures" to recall a document of interest. Hence maintaining search spaces locally may not be practical in many devices that have insufficient local memory, making a network based search configuration preferable.

In one exemplary embodiment, a television system 207 may have a set-top box or other device with a one-way link to a satellite network. In this configuration, all search data including relevance updates may be downloaded to the device through a satellite link to perform local searching. In this case, the set-top box preferably has sufficient storage capacity to maintain search spaces locally. Local storage is preferably large in this case to circumvent the deficiency of a one-way link.

Figure 4:
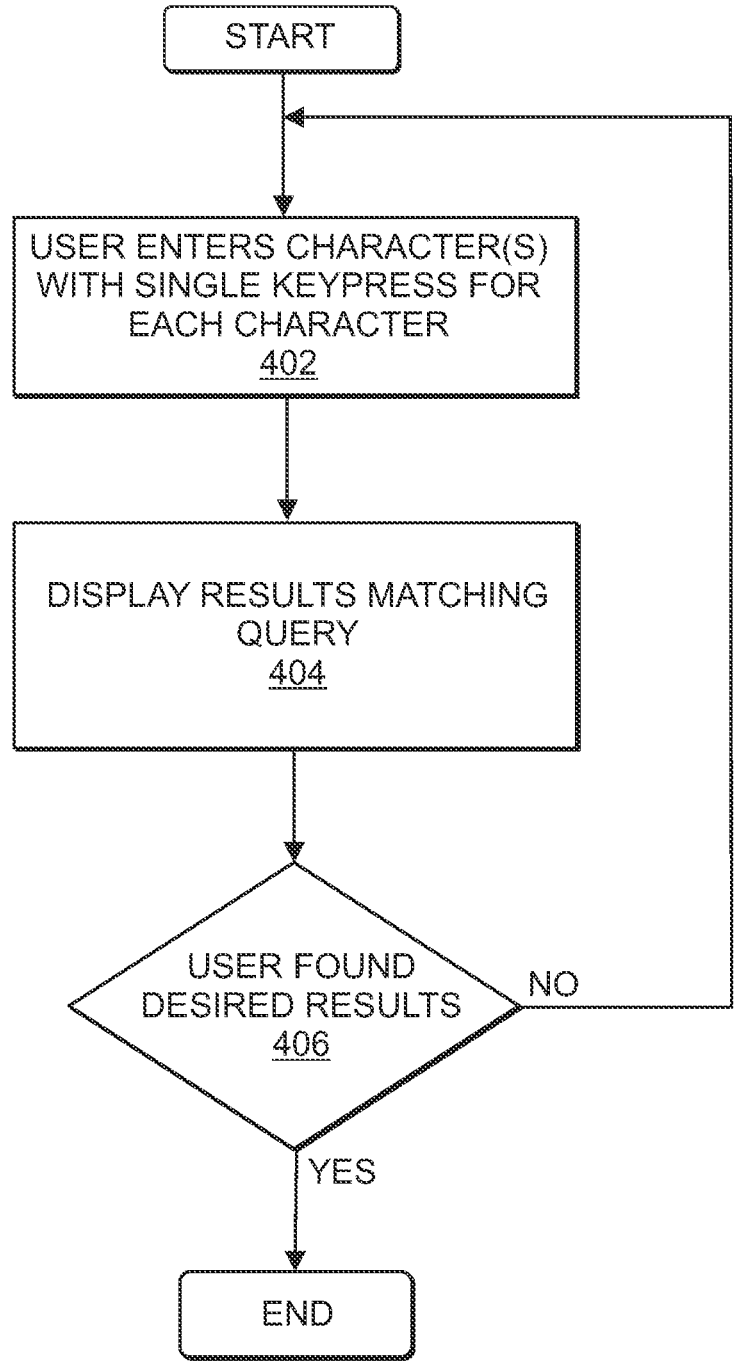
FIG. 4 is a flow chart illustrating a method for finding results with reduced text entry using an overloaded keypad in accordance with one or more embodiments of the invention.

FIG. 4 illustrates a search process in accordance with one or more embodiments of the invention. At step 402, the user enters a character using an ambiguous text input interface, e.g., using a keypad with overloaded keys where a single key press is performed for each character entered. At 404, an incremental search system determines and displays results that match the input character entered at 402. Since the input is ambiguous, the match of results would include the matches for all the ambiguous input characters represented by the single key press. To address this increased set of matches, an ordering scheme is preferably used to order the results to improve accessibility to results expected to be more of interest to the user. The ordering of results can be based on a variety of criteria including, e.g., temporal relevance, location relevance, popularity and personal preferences (that may have been determined implicitly or explicitly) or some combination of these criteria. (In a television application, temporal relevance can be used to favor programs whose timing may be more of interest to the viewer. For example, if the user entered NBA, then the system would list the games in order of temporal relevance such as those in progress or are scheduled to begin in the near future are listed at the higher on the list. The popularity criterion can be used to favor programs or channels that are more popular than others. The personal preference criterion can be used to favor programs or channels that the user has indicated preference for in prior user selections. For example, if a user frequently scrolls down to "CNBC" and selects it, the system would over time place CNBC higher in the list of results over a more generally popular channel such as CNN. Furthermore, identity independent time-based usage pattern learning algorithms can be applied in conjunction with personalization to apply the results ordering rules in an appropriate context. Also, e.g., when using a PDA or cell phone to search for a business, the system may use location relevance as part of the ordering criteria.)

In addition, other ordering schemes can also or instead be used such as, e.g., character count based subspace biasing, examples of which are described in U.S. patent application Ser. No. 60/695,463 entitled "Method And System For Incremental Search With Minimal Text Entry On Television Where The Relevance Of Results Is A Dynamically Computed Function Of User Input Search String Character Count" and filed on Jun. 30, 2005, which is assigned to the assignee of the present application and is incorporated by reference herein in its entirety.

The ordering criteria can give preference to the results matching the search query based on a lexical match of the type of query input, e.g., in the following order of preference: single term prefixes, multiple term prefixes, and lastly abbreviation matches.

If the user does not find the desired results at 406, he or she can continue to enter more characters to the search query at step 402. Then at step 404, the system will perform the search based on the cumulative substring of characters of the search query entered by the user up to that point.

Figure 5:
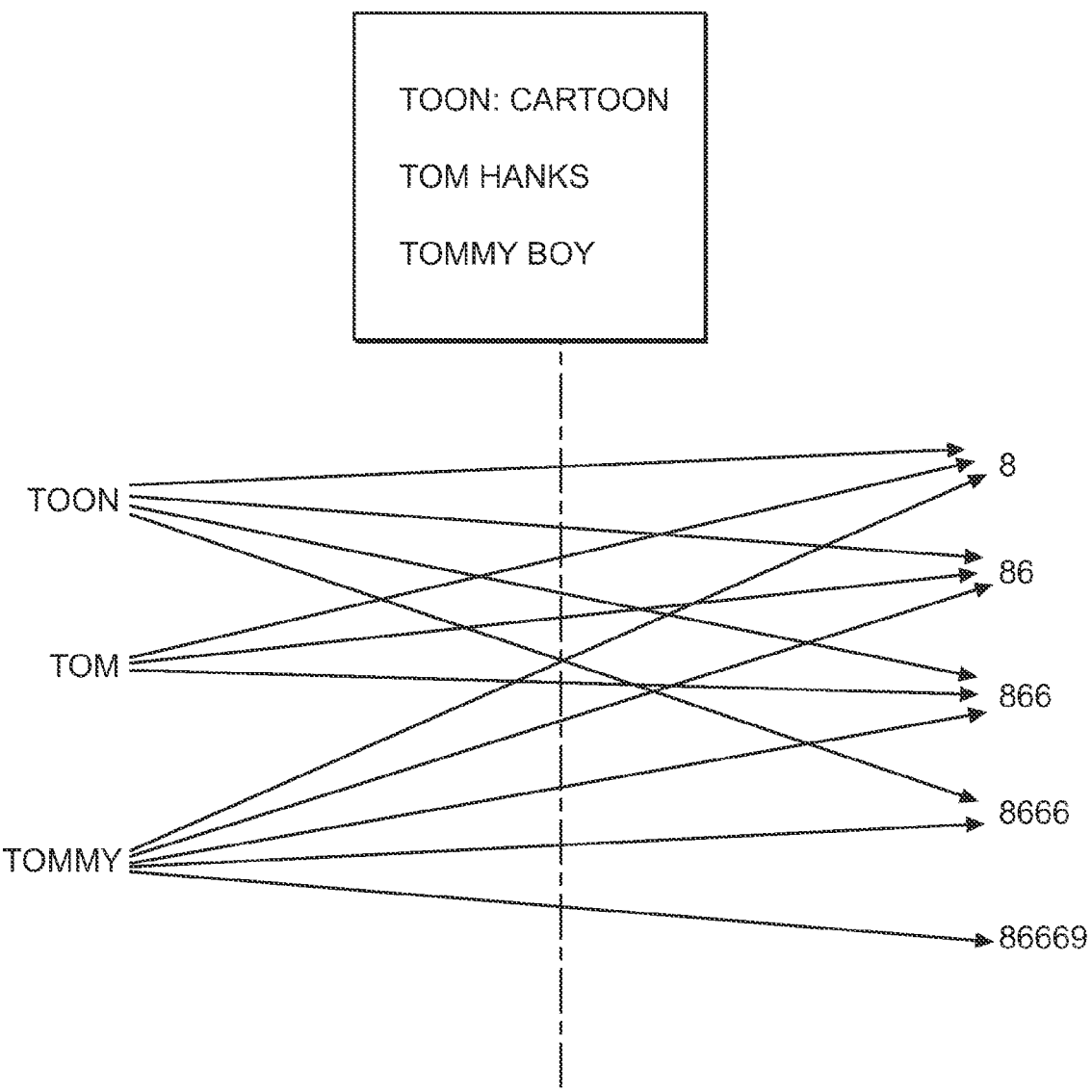
FIG. 5 illustrates a many-to-many mapping of terms to the numeric equivalents.

FIG. 5 illustrates an example of the many-to-many mapping scheme from an alphanumeric terms space to a numeric string space. The exemplary terms "TOON", "TOM", "TOMMY", which can be search terms entered by a television viewer to identify television content, are mapped to the numeric equivalents of their prefix strings: "T"(8), "TO"(86), "TOO"(866), "TOON"(8666), "TOMMY"(86669). This many-to-many mapping scheme enables incremental search processing by enabling even a single character entered by the user to retrieve relevant results. This many-to-many mapping is done during an indexing phase for all terms that can be used to discover a result.

Figure 6:
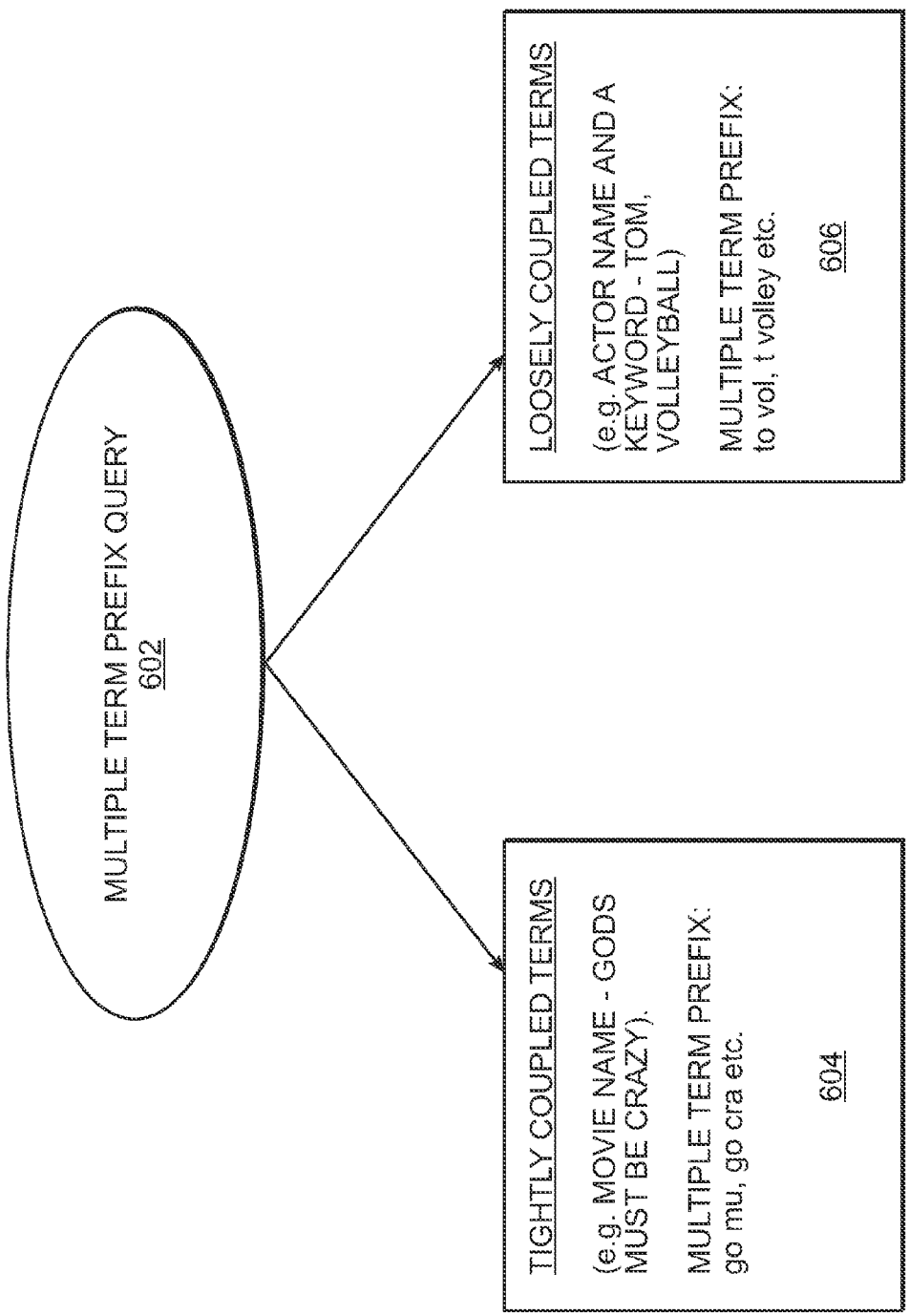
FIG. 6 illustrates the two different couplings between multiple terms in a query.

FIG. 6 illustrates the two broad categories of multiple prefix terms 602 that can be used in search queries. The terms 602 can be tightly coupled terms 604, which are closely related such the terms from movie title or name of a person (e.g., all the terms in the names Gods Must Be Crazy, and Harrison Ford). The terms may be either ordered or unordered (e.g., Ford Harrison or Harrison Ford). Loosely coupled terms 606, on the other hand, are terms that are semantically related, e.g., as in the terms "Tom Volleyball" (Tom Hanks playing a role in a movie cast away with volleyball being a keyword). The prefix based multiple terms input described herein, in addition to being an intuitive mechanism for reduced text input significantly reduces the size of the result space compared to other search techniques in which any query substring could match with results. With these other search techniques, the ambiguity in input could significantly increase the result space size, particularly when the number of characters input is low. This would force the user to enter more characters and diminish the effectiveness of the search process.

Figure 7:
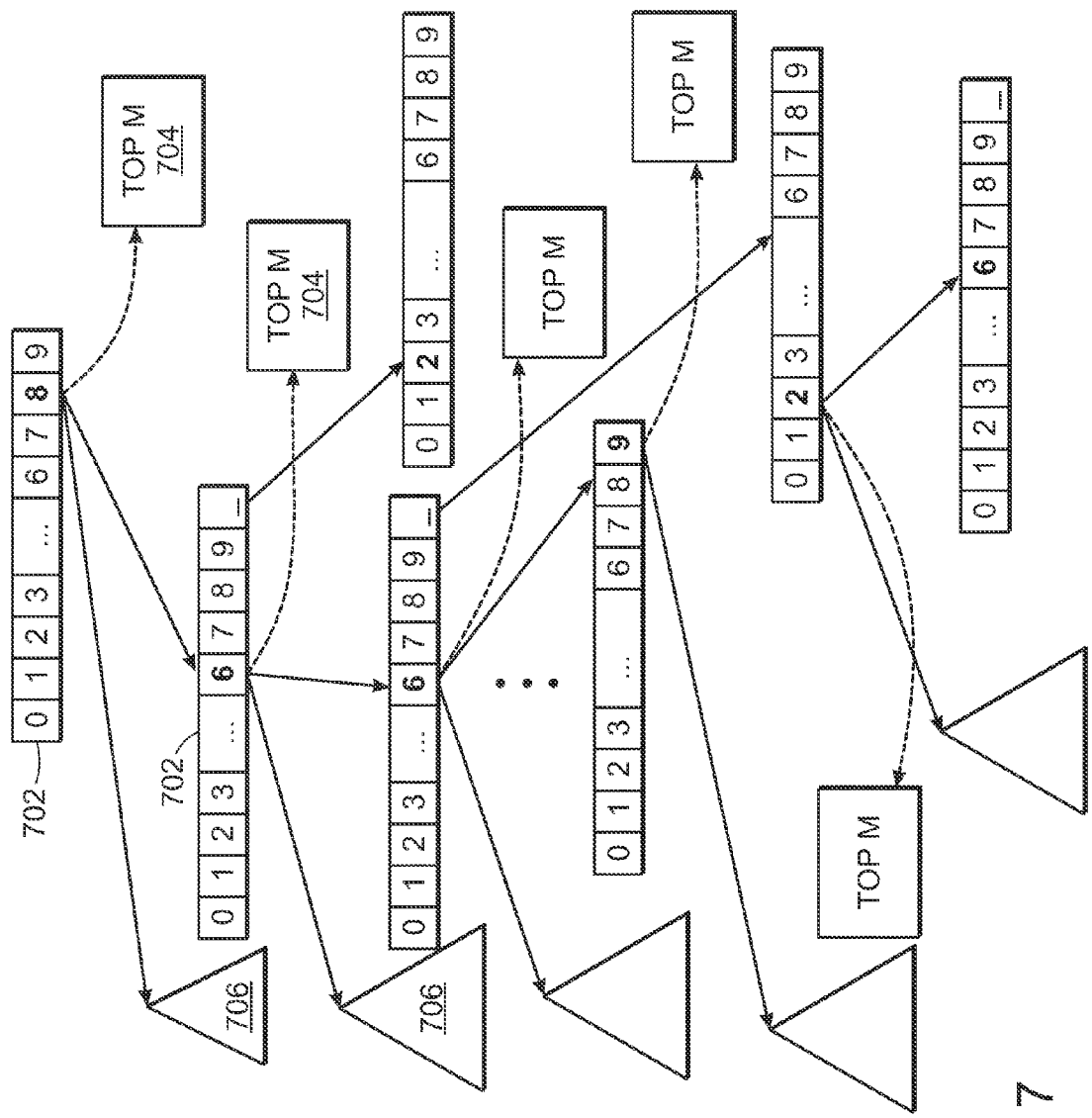
FIG. 7 illustrates a data structure for retrieving results incrementally for each character input using the many-to-many mapping scheme in accordance with one or more embodiments of the invention.

FIG. 7 illustrates a trie data structure that can be used in identifying search results in accordance with one or more embodiments of the invention. Each node 702 of the structure has numerical values from 0-9. Each node has the top M records 704 (determined from some ordering criteria) preferably in "in-memory" storage, which can be a memory that permits quick retrieval. These records are returned immediately to user based on the match string. The illustrated diagram shows the layout of the data structure for the terms "TOMMY BOY". The number of prefix terms and the size of the prefix terms used for pre-computing the trie index are determined by the memory availability and computational capabilities of the system. One example of a trie structure used for incremental searching is described in U.S. patent application Ser. No. 11/136,261 entitled "Method And System For Performing Searches For Television Content Using Reduced Text Input", which is incorporated by reference herein in its entirety. In the FIG. 7 example, the size of the prefix terms used is 2 and the number of terms for pre-computing the trie index is 2. So when the user enters any of the search queries, "8 269"(T BOY),"86 269"(TO BOY), "8 2"(T B), "86 2"(T BO), the results would be retrieved from the top M records 704 if present there. If it is beyond the top M records, the records are retrieved from the secondary storage structure 706 if it is present there. If the results are not found in the secondary structure either, the system can perform an intersection of the top "N" records (N>=M) for the individual terms, in this case, e.g., "T BOY". In preferred embodiments of the invention, the system would return the results obtained both from the trie walk (where results are obtained either from the top "M" records or from the secondary memory) and from the intersection method, where the intersection method would be deployed once the input character count exceeds a given threshold. The multiple prefix terms based search is thus realized in accordance with one or more embodiments of the invention preferably by the combination of a (1) trie walk whose strength and efficiency is highest when input character count is low, and (2) an intersection process whose strength and efficiency is highest when the input character count is above a given threshold.

One characteristic of this method of multiple prefix terms based search in accordance with one or more embodiments of the invention is the absence of an explicit term/word termination action. In other words, the system does not require each word in a search entry to be successively and separately resolved. The system in accordance with one or more embodiments of the invention disambiguates the input by leveraging off the multiple terms (both in the case of loosely coupled and tightly coupled terms).

FIGS. 8A-8C illustrate the incremental results obtained for an exemplary search query as characters of the query are input by a user in a television application. In FIG. 8A, the user has input a single character "5" with the intention that the character represent the letter "J". In this example, the user's intent is to find "Tom and Jerry" television programs, and starts with entering "Jerry" in an unordered input. However, there are multiple matches for different terms due to the input ambiguity since the single button pressed represents several characters, in this case results relate to Koala, Lola, Life etc. These terms are ordered in the displayed results list 802, e.g., by the popularity of the matching document and the relevance of the matching term to the document, and displayed on the users' television screen.

As the user has not found the desired content relating to Tom and Jerry, he or she enters additional characters in the search query. As shown in FIG. 8B, the user enters a multiple term text input: "5 86", which is intended to represent the letters "J TO". The results for this query are shown at 804. Because of the input ambiguity ([Koala, Tooth], [Hallie Todd in cast for Lizzie McGuire] etc.), matches for several unrelated programs are retrieved and displayed.

As shown in FIG. 8C, the user then inputs a further character in the search query: "5 866", which is intended to represent "J TOM". With this further character input, the system is able to identify the content of interest, and displays the results in list 806.

Methods of processing ambiguous search query inputs from users in accordance with various embodiments of the invention are preferably implemented in software, and accordingly one of the preferred implementations is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A method, comprising:
   associating subsets of content items with corresponding strings of one or more overloaded keys of a keypad so that the subsets of content items are directly mapped to the corresponding strings of one or more overloaded keys by a direct mapping, wherein at least one overloaded key of the one or more overloaded keys is associated with a plurality of alphabetical and/or numerical symbols;
   ranking content items within at least one of the subsets of content items according to one or more ordering criteria;
   subsequent to the associating and ranking, receiving entry of a first overloaded key;
   selecting and presenting a first of the subsets of content items that is associated with the first overloaded key based on the direct mapping;
   subsequent to receiving entry of the first overloaded key, receiving entry of a second overloaded key the same as or different than the first overloaded key, the second overloaded key forming a string with the first overloaded key; and
   selecting and presenting a second of the subsets of content items that is associated with the string of overloaded keys formed by the first overloaded key and the second overloaded key based on the direct mapping.

2. The method of claim 1 wherein said one or more ordering criteria include one or more of: temporal relevance, location relevance, popularity, personal preferences and/or character count.

3. The method of claim 1 wherein associating the subsets of content items with the corresponding strings of one or more overloaded keys comprises indexing said content items by performing a many-to-many mapping wherein a descriptor associated with a content item is mapped to a candidate string of one or more overloaded keys if the candidate string corresponds to an alpha-numeric string that matches the descriptor.

4. The method of claim 1 wherein a user presses the first overloaded key to cause the entry of the first overloaded key.

5. The method of claim 1 wherein said method comprises receiving entry of a plurality of overloaded keys corresponding to one or more words in an ordered format, the plurality of overloaded keys comprising the string.

6. The method of claim 1 wherein said method comprises receiving entry of a plurality of overloaded keys corresponding to one or more words in an unordered format, the plurality of overloaded keys comprising the string.

7. The method of claim 1 wherein said string represents at least part of a first word and a second word separated by a word separator.

8. The method of claim 1 wherein said string of overloaded keys is processed by a server system remote from a user.

9. The method of claim 1 wherein said string of overloaded keys is processed by a device operated by a user.

10. The method of claim 1 further comprising determining descriptors relating to the content items, wherein the second subset of content items comprises one or more content items each having a descriptor matching the string.

11. The method of claim 10 wherein said content items comprise a television content item, and wherein a descriptor of the television content item includes title, cast, director, description, and/or keyword information relating to the television content item.

12. The method of claim 1 wherein said content items include a product or service.

13. The method of claim 1 wherein the first overloaded key is entered by a user on the keypad of a cell phone, a PDA or a remote control device for a television.

14. The method of claim 1, further comprising using the one or more ordering criteria to update the subsets of content items associated with the corresponding strings of one or more overloaded keys.

15. A system comprising:

one or more computer memories collectively storing content items and instructions configured to cause one or more processors to control performance of a method comprising:

associating subsets of content items with corresponding strings of one or more overloaded keys of a keypad so that the subsets of content items are directly mapped to the corresponding strings of one or more overloaded keys by a direct mapping, wherein at least one overloaded key of the one or more overloaded keys is associated with a plurality of alphabetical and/or numerical symbols;

ranking content items within at least one of the subsets of content items according to one or more ordering criteria;

subsequent to the associating and ranking, receiving entry of a first overloaded key, selecting and presenting a first of the subsets of content items that is associated with the first overloaded key based on the direct mapping, subsequent to receiving entry of the first overloaded key, receiving entry of a second overloaded key the same as or different than the first overloaded key, the second overloaded key forming a string with the first overloaded key, and selecting and presenting a second of the subsets of content items that is associated with the string of overloaded keys formed by the first overloaded key and the second overloaded key based on the direct mapping.

16. The system of claim 15 wherein said one or more ordering criteria include one or more of: temporal relevance, location relevance, popularity, personal preferences and/or character count.

17. The system of claim 15 wherein associating the subsets of content items with the corresponding strings comprises indexing the content items by performing a many-to-many mapping wherein a descriptor associated with a content item is mapped to a candidate string of one or more overloaded keys if the candidate string corresponds to an alpha-numeric string that matches the descriptor.

18. The system of claim 15 wherein a user presses the first overloaded key to cause the entry of the first overloaded key.

19. The system of claim 15 wherein said method comprises receiving entry of a plurality of overloaded keys corresponding to one or more words in an ordered format, the plurality of overloaded keys comprising the string.

20. The system of claim 15 wherein said method comprises receiving entry of a plurality of overloaded keys corresponding to one or more words in an unordered format, the plurality of overloaded keys comprising the string.

21. The system of claim 15 wherein said string represents at least part of a first word and a second word separated by a word separator.

22. The system of claim 15 wherein at least one of the one or more processors is included in a server remote from a user causing entry of the first overloaded key, the at least one of the one or more processors controlling the receiving of the entry of the first overloaded key, the selecting and presenting the first subset of content items, the receiving the entry of the second overloaded key, and/or the selecting and presenting the second subset of content items.

23. The system of claim 15 wherein at least one of the one or more processors is included in a device operated by a user causing entry of the first overloaded key, the at least one of the one or more processors controlling the receiving of the entry of the first overloaded key, the selecting and presenting the first subset of content items, the receiving the entry of the second overloaded key, and/or the selecting and presenting the second subset of content items.

24. The system of claim 15 wherein the method further comprises determining descriptors relating to the content items, wherein the second subset of content items comprises one or more content items each having a descriptor matching the string.

25. The system of claim 24 wherein said content items comprise a television content item, and wherein a descriptor of the television content item includes title, cast, director, description, and/or keyword information relating to the television content item.

26. The system of claim 15 wherein said content items comprise products and/or services.

27. The system of claim 15 wherein the first overloaded key is entered by a user on the keypad of a cell phone, a PDA or a remote control device for a television.

28. The system of claim 15, wherein the method further comprises updating the subsets of content items associated with the corresponding strings of one or more unresolved keystrokes based on the one or more ordering criteria.

29. The system of claim 15, wherein the one or more computer memories comprise a first computer memory remote from a user causing entry of the first overloaded key, and wherein the first subset of content items is stored on the first computer memory.

30. The system of claim 15, wherein the one or more computer memories comprise a first computer memory of a device operated by a user causing entry of the first overloaded key, and wherein the first subset of content items is stored on the first computer memory.

31. The system of claim 15, wherein said content items comprise information about audio and/or video content.

* * * * *